US012656213B2

(12) United States Patent
　　 Cambrea et al.

(10) Patent No.:　US 12,656,213 B2
(45) Date of Patent: 　　Jun. 16, 2026

(54) FLARE AIR SPEED SIMULATION TEST DEVICE

(71) Applicant: The United States of America, as Represented by the Secretary of the Navy, Crane, IN (US)

(72) Inventors: Lee R. Cambrea, Bloomington, IN (US); Terry Chastain, Bedford, IN (US); Joshua Ryan Geary, Bloomington, IN (US); Eric Alan Hillenbrand, Evansville, IN (US); Shad Truelove, Montgomery, IN (US)

( * ) Notice: Subject to any disclaimer, the term of this patent is extended or adjusted under 35 U.S.C. 154(b) by 251 days.

(21) Appl. No.: 18/384,475

(22) Filed: Oct. 27, 2023

(65) Prior Publication Data

US 2025/0137876 A1　　May 1, 2025

(51) Int. Cl.
　　 *G01M 9/08*　　　(2006.01)
　　 *F42B 35/00*　　　(2006.01)
(52) U.S. Cl.
　　 CPC .............. *G01M 9/08* (2013.01); *F42B 35/00* (2013.01)
(58) Field of Classification Search
　　 CPC ... G01M 9/00; G01M 9/08; F42B 4/26; F42B 35/00
　　 See application file for complete search history.

(56) References Cited

U.S. PATENT DOCUMENTS 3,987,966 A * 10/1976 Ruda ....................... F42B 12/70
　　　　　　　　　　　　　　　　　　　　　　 222/410

* cited by examiner

*Primary Examiner* — Erika J. Villaluna
(74) *Attorney, Agent, or Firm* — Naval Surface Warfare Center, Crane Division; Christopher Feigenbutz

(57)　　　　　　　ABSTRACT

Disclosed is a linear air speed simulation device for testing countermeasures. The device includes a frame; at minimum one countermeasure dispenser rotating around a radius; a motor; a countermeasure firing system and circuitry; a countermeasure; a controller; and a firing circuit power supply. A linear speed value is inputted into the controller, causing the motor to rotate the dispenser at a revolutions per minute equal to the inputted linear speed value. The countermeasure firing system and circuitry monitors speed and position of the countermeasure as it rotates and causes dispensing of the countermeasure in a desired direction once the linear speed value and the revolutions per minute value are equal. The inventive device can achieve the same linear speeds as aircraft and ground based test systems, in a safe and cost effective manner that does not require the use of rocket sleds and extended linear tracks to achieve aircraft speeds.

11 Claims, 6 Drawing Sheets

FLARE AIR SPEED SIMULATION TEST DEVICE

STATEMENT REGARDING FEDERALLY SPONSORED RESEARCH OR DEVELOPMENT

The invention described herein includes contributions by one or more employees of the Department of the Navy made in performance of official duties and may be manufactured, used and licensed by or for the United States Government for any governmental purpose without payment of any royalties thereon. This invention (Navy Case 210068US01) is assigned to the United States Government and is available for licensing for commercial purposes. Licensing and technical inquiries may be directed to the Technology Transfer Office, Naval Surface Warfare Center Crane, email: Crane_T2@navy.mil.

FIELD OF THE INVENTION

The field of invention relates generally to testing and measuring devices. More particularly, it pertains to an air speed simulation device for testing countermeasures.

BACKGROUND

It is known that countermeasures behave differently when dispensed in an airstream, statically, and from a moving aircraft. Flight testing is an expensive method of countermeasure testing but it is necessary for effectiveness testing and certifying that the units will dispense properly from actual aircraft. Quality control testing of countermeasures is currently done without airflow from the ground or with the unit held statically as air is blown across/over the unit.

Current air speed simulation testing systems include the use of linear SLED tracks that propel the countermeasure down a straight track at high speed. As can be appreciated, these SLED tracks are expensive to build and need large straight areas clear of hazards for countermeasures to dispense. In an effort to decrease the length of SLED tracks (time required to reach speed), attempts have been made to utilize compressed gases (steam) and rockets. Steam, however, interferes with infrared measurements and still requires significant lengths of track to reach desired speeds. Rockets are generally one time use and expensive. Time between tests is very slow for both methods. From the above, it is evident that a more realistic dispense scenario to minimize the need for flight testing and improve quality control is needed.

SUMMARY OF THE INVENTION

The present invention relates to an air speed simulation device for testing countermeasures. The device includes a frame; at minimum one countermeasure dispenser rotating around a radius; a motor; a countermeasure firing system and circuitry; at minimum one countermeasure a speed controller; and a power supply. A linear speed value is inputted into the controller, causing the motor to rotate the dispenser/s at a revolutions per minute equal to the inputted linear speed value. The countermeasure firing system and circuitry monitors speed and radial position of the countermeasure as it rotates and causes dispensing of the countermeasure in a desired direction once the linear speed value and the revolutions per minute value are equal. The inventive device can achieve the same linear speeds as aircraft and ground based test systems, in a safe and cost effective manner that does not require the use of rocket sleds and extended linear tracks to achieve aircraft speeds.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which:

FIG. 4 shows a side view of an air speed simulation device for testing countermeasures.

DETAILED DESCRIPTION OF THE DRAWINGS

Figure 1:
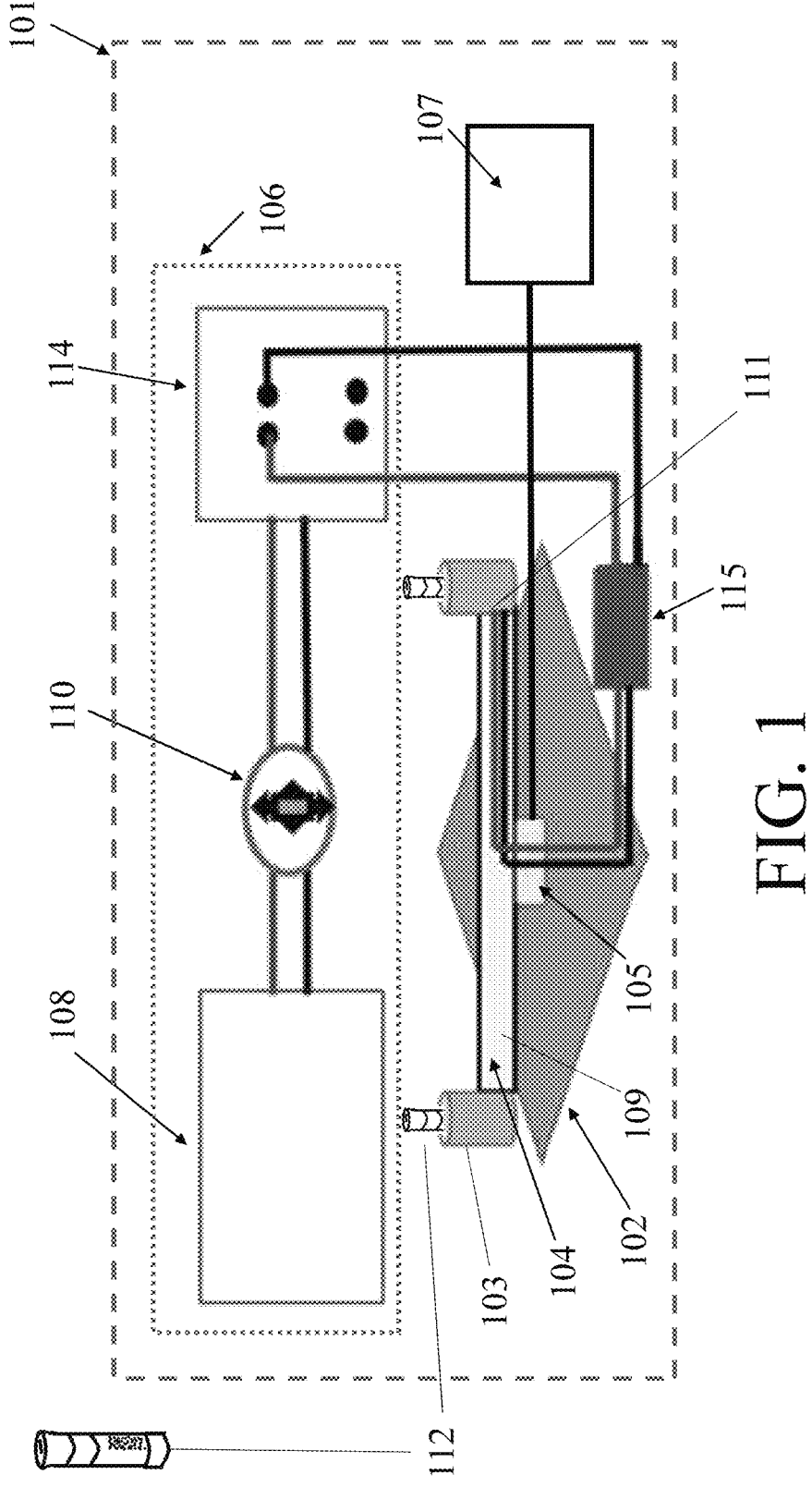
FIG. 1 shows a view of an air speed simulation device for testing countermeasures.

The embodiments of the invention described herein are not intended to be exhaustive or to limit the invention to precise forms disclosed. Rather, the embodiments selected for description have been chosen to enable one skilled in the art to practice the invention.

Generally, provided is a linear air speed simulation device for testing countermeasures comprising: a frame; at least one angle adjustable countermeasure dispenser rotating around a radius; a motor; a countermeasure firing system and circuitry; at least one countermeasure; a controller; and a power supply; wherein a linear speed value is inputted into the controller, causing the motor to rotate the at least one countermeasures dispenser around the radius at a revolutions per minute equal to the inputted linear speed value divided by the radius times two times pi times 60; wherein the countermeasure firing system and circuitry monitors speed and position of the countermeasure as it rotates and causes dispensing of the countermeasure in a desired direction once the linear speed value and the revolutions per minute value are equal.

In an illustrative embodiment, the device further comprises a high-speed camera mounted centrally to the rotating radius to provide a view of dispensing of the countermeasure. In an illustrative embodiment, the countermeasure firing system and circuitry causes dispensing of the countermeasure perpendicular to the spin. In an illustrative embodiment, the radius comprises a wheel and a pair of countermeasure dispensers on opposite sides of the wheel. In an illustrative embodiment, the device comprises a base, a vertical or horizontal frame, and a vertically or horizontally rotating arm with the countermeasure dispenser at one end and an optional counterweight or second countermeasure dispenser at the opposite end.

In an illustrative embodiment, provided is a linear air speed simulation device for testing countermeasures comprising: a frame; a wheel and a pair of countermeasure dispensers on opposite sides of the wheel; a motor; a countermeasure firing system and circuitry; at least one countermeasure; a controller; and a firing circuit power supply; wherein a linear speed value is inputted into the controller, causing the motor to rotate the at least one countermeasures dispenser around the radius at a revolutions per minute equal to the inputted linear speed value divided by the radius times two times pi times 60; wherein the countermeasure firing system and circuitry monitors speed and position of the countermeasure as it rotates and causes dispensing of the countermeasure in a desired direction once the linear speed value and the revolutions per minute value are equal.

In an illustrative embodiment, provided is a linear air speed simulation device for testing countermeasures comprising: a base; a vertical frame; a vertically rotating arm with a countermeasure dispenser at one end and a counterweight at an opposite end; a controller; and a firing circuit power supply; wherein a linear speed value is inputted into the controller, causing the motor to rotate the at least one countermeasures dispenser around the radius at a revolutions per minute equal to the inputted linear speed value divided by the radius times two times pi times 60; wherein the countermeasure firing system and circuitry monitors speed and position of the countermeasure as it rotates and causes dispensing of the countermeasure in a desired direction once the linear speed value and the revolutions per minute value are equal.

FIG. 1 shows a view an air speed simulation device 101 for testing countermeasures. In an illustrative embodiment, the countermeasure testing device 101 comprises a frame 102, at least one countermeasures dispenser 103 rotating around a radius 104; a motor 105; a countermeasure firing system and circuitry 106; a controller 107, and a firing circuit power supply 108. In an illustrative embodiment, the motor 105 is mounted in the center of the frame 102. In an illustrative embodiment, the countermeasures dispenser 103 rotating around a radius 104 comprises an arm 109 attached to the motor 105 that spins in a circular motion with speeds based on the revolutions per minute of the motor 105. In an illustrative embodiment, a single shot, 1×1 countermeasure dispenser 103 is located at each end of the arm 109 for dispensing a countermeasure 112.

In an illustrative embodiment, the firing circuit power supply 108 comprises a 28-volt fire pulse that is sent through the countermeasure firing system and circuitry 106 (two layers of safety interlock comprising a key switch 110 and shunt box 114 before connection to an emergency stop 115. Firing system and circuitry 106 wiring is run from the emergency stop 115, through the frame 102, and to the contacts 111 on the countermeasure dispenser 103. The countermeasure 112 is activated upon exposure to the fire pulse and the payload is expelled from dispenser 103.

The inventive device tests countermeasures by utilizing a circular path to simulate linear speeds achieved by an aircraft during flight. As can be appreciated, a circular path device requires less space to operate, which reduces cost and the dangers associated with testing countermeasures over a linear distance. In an illustrative embodiment, a linear speed value is received by the controller 107, which causes the motor 105 to rotate at least one countermeasures dispenser 103 around a radius 104. The revolutions per minute of the motor is calculated by the controller 107. In an illustrative embodiment, the motor 105 rotates at least one countermeasures dispenser 103 around the radius 104 at a revolutions per minute equal to the inputted linear velocity divided by the radius times two times pi times 60, as shown in the below calculation.

$$RPM = \frac{\text{Inputted linear velocity}}{2r\pi 60}$$

As can be appreciated, the calculation enables the controller to cause the motor to achieve a rotational speed equal to the inputted linear speed.

In an illustrative embodiment, the countermeasure firing system and circuitry monitors the position of the countermeasure as it rotates and causes dispensing in a desired direction so the dispense happens in the same place every time. In an illustrative embodiment, the device can be designed to rotate horizontally or vertically, which will be shown in greater detail below. Additionally, the angle adjustable nature of the dispenser will afford ease of dispensing (if aimed outward to counteract centrifugal forces) and can be used to mimic specific aircraft setups. In an illustrative embodiment, a high-speed camera can be mounted in the center of the spinning axis to have a steady view of the dispense event. The current prototype spins horizontally but the fixture could also be made to spin vertically. Dispense will occur perpendicular to the direction of spin in either configuration.

Figure 2:
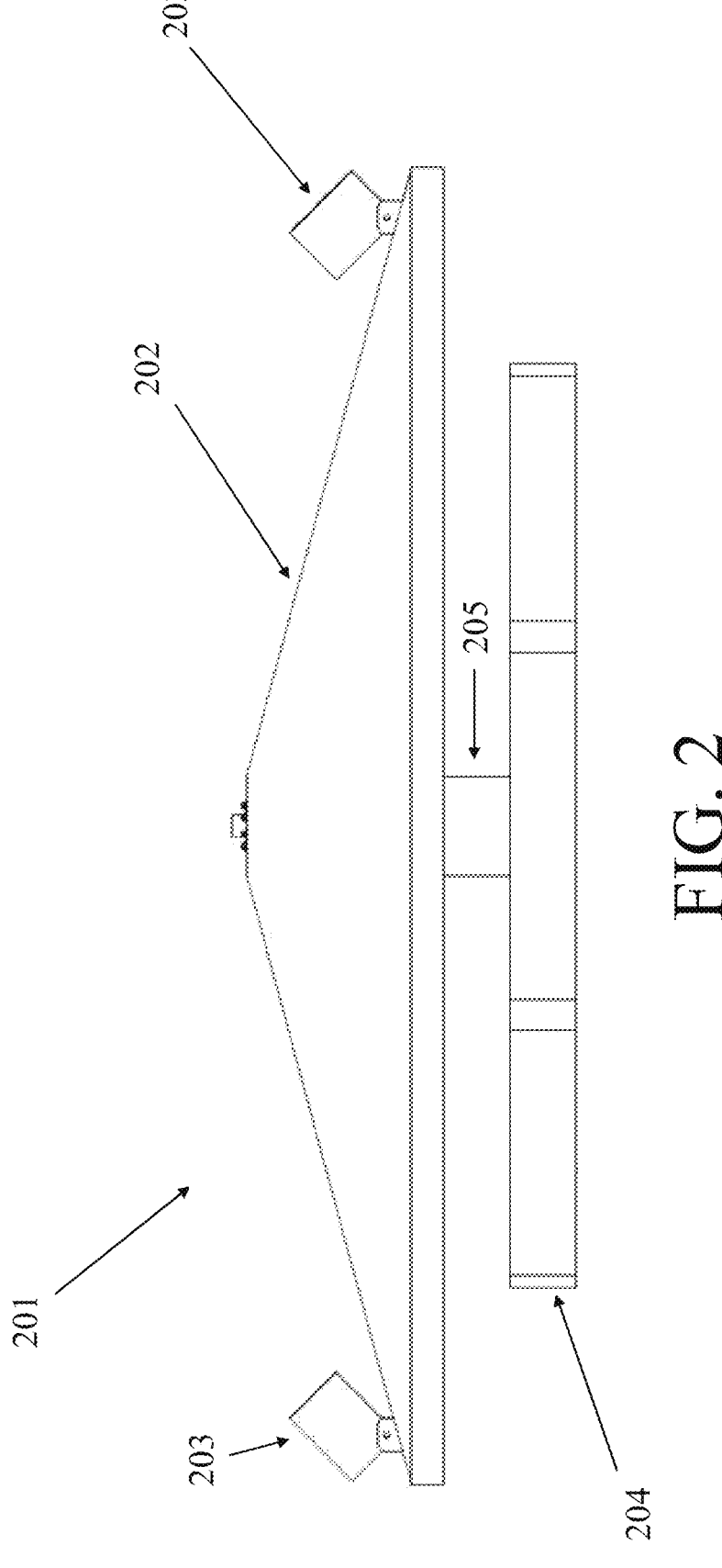
FIG. 2 shows a side view of an air speed simulation device for testing countermeasures.
Figures 3A, 3B:
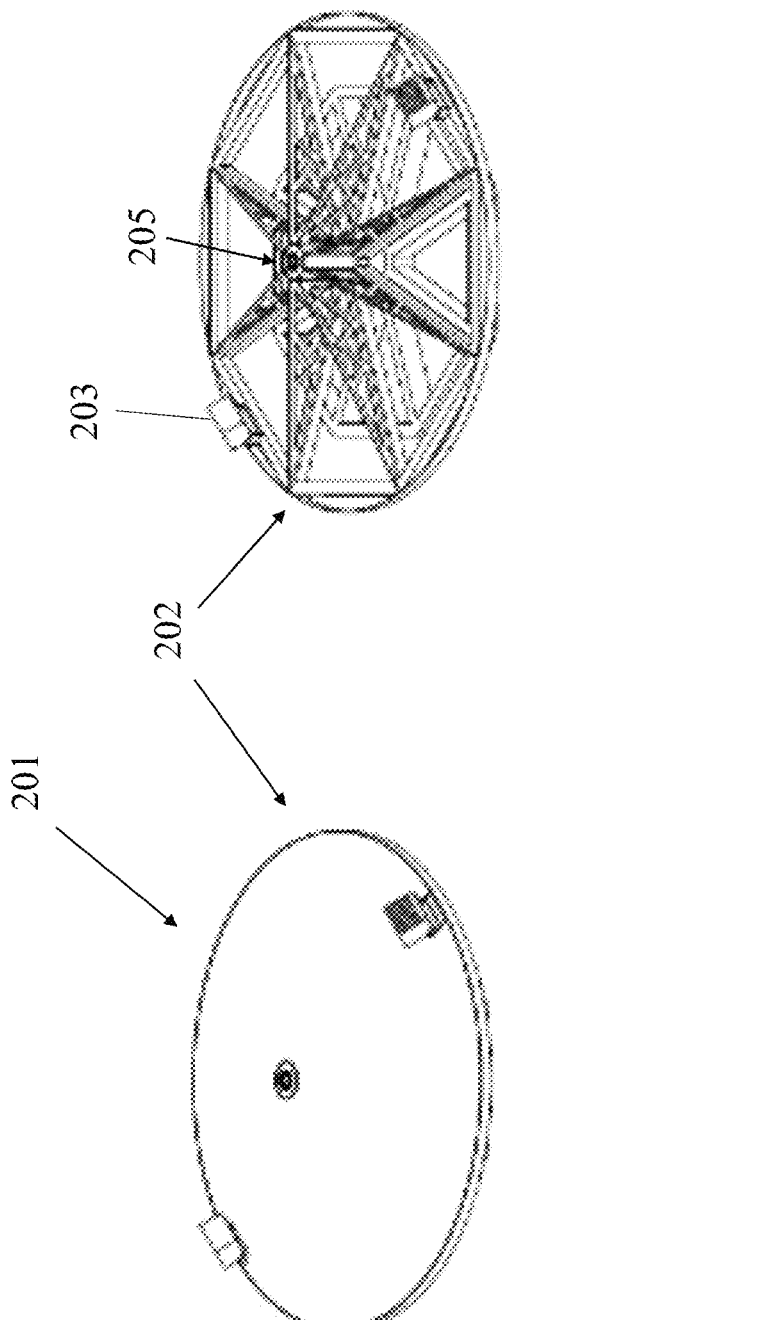
FIG. 3A shows a perspective view of an air speed simulation device for testing countermeasures.
FIG. 3B shows a perspective cutaway view of an air speed simulation device for testing countermeasures.

FIGS. 2 and 3A-B show views of an embodiment of a countermeasure testing device 201. In this embodiment, the device comprises a wheel 202 with a countermeasure dispenser 203 on opposite sides of the wheel 202. In an illustrative embodiment, the countermeasure dispensers 203 are angle adjustable to optimize the trajectory of the countermeasure when dispensed. A base frame 204 supports the wheel 202 as it rotates on a hub 205. The motor, a countermeasure firing system and circuitry, controller and firing circuit power supply function in the embodiment as described above.

Figure 4:
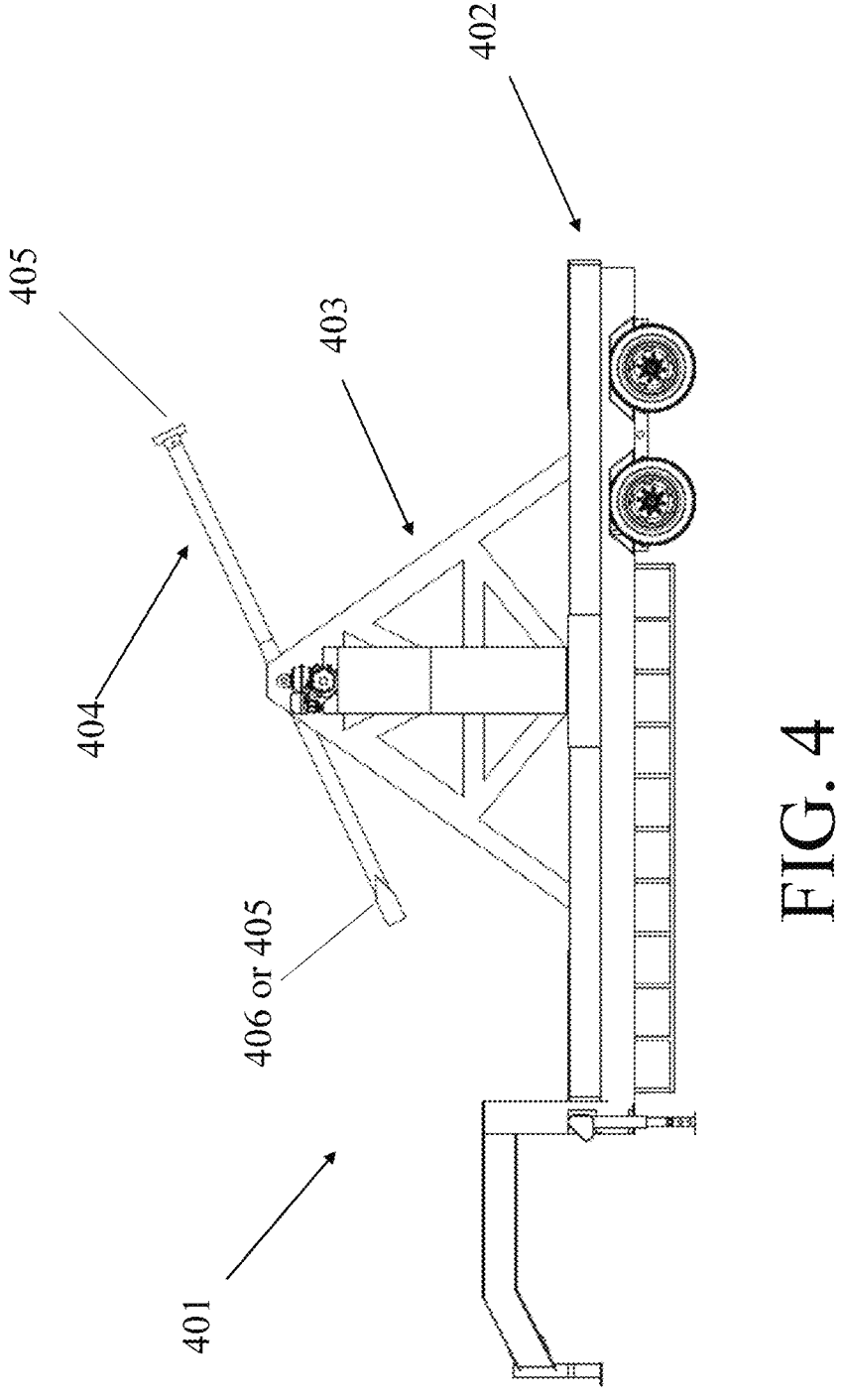
FIG. 4 shows a side view of a trailer embodiment of an air speed simulation device for testing countermeasures.
Figure 5:
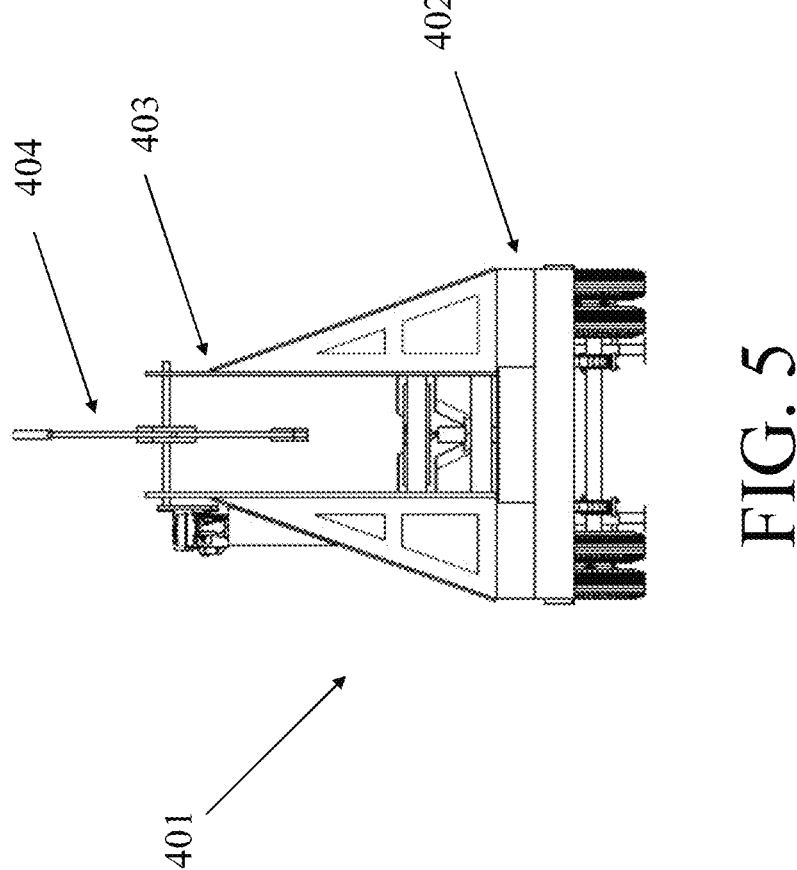
FIG. 5 shows a rear view of an air speed simulation device for testing countermeasures.
Figure 6:
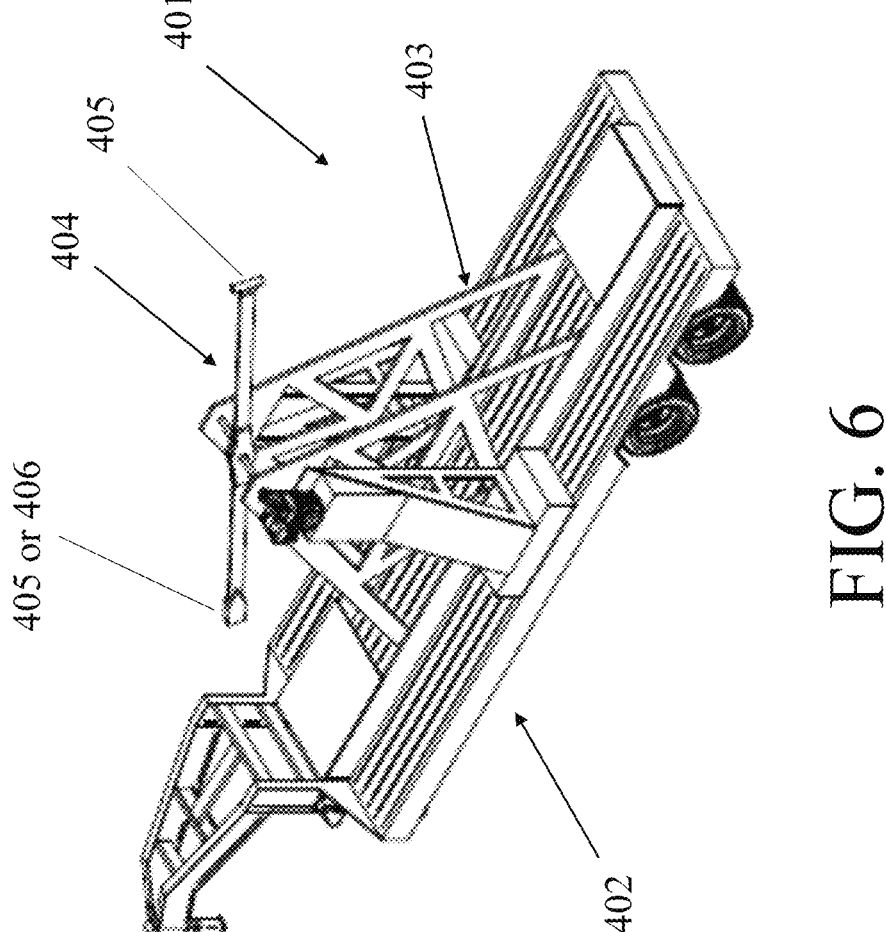
FIG. 6 shows a perspective view of an air speed simulation device for testing countermeasures.

FIGS. 4-6 show views of a trailer embodiment of a countermeasure testing device 401. In an illustrative embodiment, the testing device 401 can be configured with a vertical spin instead of horizontal, as in the above embodiments. The device 401 includes a base 402, a vertical frame 403, and a dispenser rotating vertically around a radius via an arm 404 with a countermeasure dispenser 405 at one end and an optional counterweight 406 or second countermeasure dispenser 405 at the other. In an illustrative embodiment, the dispensing of the countermeasure occurs perpendicular to the spin to avoid throwing the countermeasure large distances. An additional advantage of vertical rotation is that it causes the countermeasure to dispense in the forward direction, allowing a safe zone behind the device for personnel.

The inventive device can achieve the same linear speeds as SLED tracks. The time to reach appropriate linear speed does not matter on a circular platform (i.e., no extra length of track, only additional revolutions). Countermeasures can be dispensed at different angles and can be dispensed from both sides simultaneously to allow for modeling flare patterns. Time between tests is as simple as reloading units and pressing start.

Although the invention has been described in detail with reference to certain preferred embodiments, variations and modifications exist within the spirit and scope of the invention as described and defined in the following claims.

The invention claimed is:

1. A linear air speed simulation device for testing countermeasures comprising:
   a frame;
   at least one angle adjustable countermeasure dispenser rotating around a radius;
   a motor;
   a countermeasure firing system and circuitry;
   at least one countermeasure;
   a controller; and
   a firing circuit power supply;
   wherein a linear speed value is inputted into said controller, causing said motor to rotate said at least one countermeasure dispenser around said radius at a revolutions per minute equal to said inputted linear speed value divided by said radius times two times pi times 60;
   wherein said countermeasure firing system and circuitry monitors speed and position of said countermeasure as it rotates and causes dispensing of said countermeasure in a desired direction once said linear speed value and said revolutions per minute value are equal.

2. The device of claim 1, further comprising a high-speed camera mounted centrally to said rotating radius to provide a view of dispensing of said countermeasure.

3. The device of claim 1, wherein said countermeasure firing system and circuitry causes dispensing of said countermeasure perpendicular to the spin.

4. The device of claim 1, wherein said radius comprises a wheel and a pair of countermeasure dispensers on opposite sides of said wheel.

5. The device of claim 1, wherein said device comprises a base, a vertical frame, and a vertically rotating arm with said countermeasure dispenser at one end and an optional counterweight or second countermeasure dispenser at an opposite end.

6. A linear air speed simulation device for testing countermeasures comprising:
   a frame;
   a wheel and a pair of countermeasure dispensers on opposite sides of said wheel;
   a motor;
   a countermeasure firing system and circuitry;
   at least one countermeasure;

a controller; and
   a firing circuit power supply;
   wherein a linear speed value is inputted into said controller, causing said motor to rotate at least one countermeasure dispenser around said radius at a revolutions per minute equal to said inputted linear speed value divided by said radius times two times pi times 60;
   wherein said countermeasure firing system and circuitry monitors speed and position of said countermeasure as it rotates and causes dispensing of said countermeasure in a desired direction once said linear speed value and said revolutions per minute value are equal.

7. The device of claim 1, further comprising a high-speed camera mounted centrally to said rotating radius to provide a view of dispensing of said countermeasure.

8. The device of claim 1, wherein said countermeasure firing system and circuitry causes dispensing of said countermeasure perpendicular to the spin.

9. A linear air speed simulation device for testing countermeasures comprising:
   a base;
   a vertical frame;
   a vertically rotating arm with a countermeasure dispenser at one end and a counterweight or second countermeasure dispenser at an opposite end;
   a controller; and
   a firing circuit power supply;
   wherein a linear speed value is inputted into said controller, causing said motor to rotate at least one countermeasure dispenser around said radius at a revolutions per minute equal to said inputted linear speed value divided by said radius times two times pi times 60;
   wherein said countermeasure firing system and circuitry monitors speed and position of said countermeasure as it rotates and causes dispensing of said countermeasure in a desired direction once said linear speed value and said revolutions per minute value are equal.

10. The device of claim 1, further comprising a high-speed camera mounted centrally to said rotating radius to provide a view of dispensing of said countermeasure.

11. The device of claim 1, wherein said countermeasure firing system and circuitry causes dispensing of said countermeasure perpendicular to the spin.

* * * * *